United States Patent
Takatsuka et al.

(10) Patent No.: US 12,113,782 B2
(45) Date of Patent: Oct. 8, 2024

(54) INFORMATION PROCESSING APPARATUS, INFORMATION PROCESSING METHOD AND COMPUTER READABLE MEDIUM

(71) Applicant: Mitsubishi Electric Corporation, Tokyo (JP)

(72) Inventors: Yuya Takatsuka, Tokyo (JP); Yuta Atobe, Tokyo (JP); Naoki Itoi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 679 days.

(21) Appl. No.: 17/235,191

(22) Filed: Apr. 20, 2021

(65) Prior Publication Data
US 2021/0243176 A1 Aug. 5, 2021

Related U.S. Application Data

(63) Continuation of application No. PCT/JP2018/045703, filed on Dec. 12, 2018.

(51) Int. Cl.
*H04L 9/40* (2022.01)
*H04L 12/40* (2006.01)
*H04W 12/06* (2021.01)

(52) U.S. Cl.
CPC .............. *H04L 63/08* (2013.01); *H04L 12/40* (2013.01); *H04W 12/06* (2013.01)

(58) Field of Classification Search
CPC ...... H04L 63/08; H04W 12/06; H04W 12/40; H04W 4/48
See application file for complete search history.

(56) References Cited

U.S. PATENT DOCUMENTS 9,686,294 B2 * 6/2017 Kantor ............... H04W 4/40
9,705,678 B1 * 7/2017 Wang ............... G06F 21/602
(Continued)

FOREIGN PATENT DOCUMENTS

CN 104079456 A 10/2014
JP 2004-525579 A 8/2004
(Continued)

OTHER PUBLICATIONS

Nilsson, Dennis K., Phu H. Phung, and Ulf E. Larson. "Vehicle ECU classification based on safety-security characteristics." IET Road Transport Information and Control-RTIC 2008 and ITS United Kingdom Members' Conference. IET, 2008, pp. 1-7. (Year: 2008).*

(Continued)

*Primary Examiner* — Kari L Schmidt
(74) *Attorney, Agent, or Firm* — Birch, Stewart, Kolasch & Birch, LLP

(57) ABSTRACT

A waveform analysis unit (102) analyzes a waveform obtained by measuring one of a voltage value and an impedance value of a bus line (300). A device authentication unit (104) determines whether a new device is connected to the bus line, the new device being a device not included in configuration information (1070) which includes one or more devices known to be connected to the bus line, performs authentication for each of the devices connected to the bus line, and when the new device is connected to the bus line, acquires authentication information used for the authentication for the new device, and performs the authentication for the new device. An illegitimate operation determination unit (105) determines whether or not illegitimate operation is performed on the bus line, by using the configuration information, an analysis result from the waveform analysis unit, and an authentication result from the device authentication unit.

12 Claims, 9 Drawing Sheets

(56) References Cited

U.S. PATENT DOCUMENTS

| | | | |
|---|---|---|---|
| 9,881,165 B2* | 1/2018 | Litichever | H04L 63/1425 |
| 10,009,325 B1* | 6/2018 | David | H04L 9/16 |
| 2004/0133721 A1 | 7/2004 | Ellerbrock | |
| 2007/0088885 A1 | 4/2007 | Ellerbrock | |
| 2012/0215754 A1 | 8/2012 | Marzani et al. | |
| 2014/0114497 A1 | 4/2014 | Miyake | |
| 2014/0297109 A1 | 10/2014 | Shimomura et al. | |
| 2014/0337829 A1 | 11/2014 | Ito | |
| 2015/0271201 A1* | 9/2015 | Ruvio | H04L 67/12 726/23 |
| 2017/0099201 A1 | 4/2017 | Segawa | |
| 2017/0318044 A1* | 11/2017 | Dagmi | H04L 43/10 |
| 2018/0068107 A1 | 3/2018 | Takemori et al. | |
| 2018/0248766 A1* | 8/2018 | Ezra | H04L 63/1416 |
| 2019/0265966 A1 | 8/2019 | Shimomura | |
| 2019/0385057 A1* | 12/2019 | Litichever | H04L 63/14 |
| 2020/0067955 A1* | 2/2020 | Hass | H04L 12/40013 |
| 2020/0145251 A1* | 5/2020 | Hass | G06F 11/076 |
| 2020/0233019 A1 | 7/2020 | Atobe | |
| 2020/0389469 A1* | 12/2020 | Litichever | H04W 4/40 |
| 2021/0097210 A1 | 4/2021 | Atobe | |

FOREIGN PATENT DOCUMENTS

| | | |
|---|---|---|
| JP | 2013-17140 A | 1/2013 |
| JP | 2013-507294 A | 3/2013 |
| JP | 2013-216245 A | 10/2013 |
| JP | 2014-11621 A | 1/2014 |
| JP | 2014-193654 A | 10/2014 |
| JP | 2016-111477 A | 6/2016 |
| JP | 2016-184835 A | 10/2016 |
| JP | 2018-72920 A | 5/2018 |
| JP | 6373529 B1 | 8/2018 |
| WO | 2013/128648 A1 | 9/2013 |
| WO | 2015/194323 A1 | 12/2015 |
| WO | 2018/146747 A1 | 8/2018 |
| WO | 2018/146845 A1 | 8/2018 |
| WO | WO2019/049285 A1 | 3/2019 |

OTHER PUBLICATIONS

W. Wu et al., "Sliding Window Optimized Information Entropy Analysis Method for Intrusion Detection on In-Vehicle Networks," in IEEE Access, vol. 6, pp. 45233-45245, 2018. (Year: 2018).*

S. Parkinson, P. Ward, K. Wilson and J. Miller, "Cyber Threats Facing Autonomous and Connected Vehicles: Future Challenges," in IEEE Transactions on Intelligent Transportation Systems, vol. 18, No. 11, pp. 2898-2915, Nov. 2017. (Year: 2017).*

Cho, Kyong-Tak, and Kang G. Shin. "Error handling of in-vehicle networks makes them vulnerable." Proceedings of the 2016 ACM SIGSAC Conference on Computer and Communications Security. 2016, pp. 1044-1055. (Year: 2016).*

Gupta, Maanak, and Ravi Sandhu. "Authorization framework for secure cloud assisted connected cars and vehicular internet of things." Proceedings of the 23nd ACM on symposium on access control models and technologies. 2018, pp. 193-204. (Year: 2018).*

International Search Report (PCT/ISA/210) issued in PCT/JP2018/045703, dated Feb. 5, 2019.

Chinese Office Action and Search Report for Chinese Application No. 201880100031.0, dated May 23, 2022, with an English translation.

* cited by examiner

INFORMATION PROCESSING APPARATUS, INFORMATION PROCESSING METHOD AND COMPUTER READABLE MEDIUM

CROSS REFERENCE TO RELATED APPLICATION

This application is a Continuation of PCT International Application No. PCT/JP2018/045703, filed on Dec. 12, 2018, which is hereby expressly incorporated by reference into the present application.

TECHNICAL FIELD

The present invention relates to a technique for verifying validity of a device connected to a bus line.

BACKGROUND ART

A network system in which a plurality of devices are connected to a bus line is widely used. For example, a CAN (Controller Area Network), which is widely used as an in-vehicle network, is a bus-type network. A device is easily retrofitted to a bus-type network system. Therefore, in a use case (for example, car sharing or the like) where an unspecified number of users can access one bus line, an illegitimate device may be connected to the bus line by a malicious user. Then, when the illegitimate device is connected to the bus line, for example, confidential information flowing on the bus line may be wiretapped by the illegitimate device. In addition, illegitimate data may be transmitted to another device on the bus line by the illegitimate device.

Besides, Patent Literature 1 discloses a technique for detecting illegitimate operation on a bus line by performing authentication using authentication information when a change on a voltage is detected. In Patent Literature 1, it is possible to detect, for example, an illegitimate device illegitimately connected to the bus line.

CITATION LIST

Patent Literature

Patent Literature 1: JP2016-111477A

SUMMARY OF INVENTION

Technical Problem

In the technique of Patent Literature 1, a device for which an authentication result is abnormal is determined as the illegitimate device.

However, the technique of Patent Literature 1 has a problem that when a legitimate device is newly added to the bus line or a device is removed from the bus line, it erroneously detects that there is the illegitimate operation on the bus line. The present invention mainly aims to solve such a problem. Specifically, the present invention mainly aims to properly detect illegitimate operation on a bus line.

Solution to Problem

An information processing apparatus according to the present invention includes:
- a waveform analysis unit to analyze a measured waveform which is a waveform obtained by measuring one of a voltage value and an impedance value of a bus line;
- a device authentication unit to determine whether or not a new device is connected to the bus line, the new device being a device not included in configuration information which includes one or more devices known to be connected to the bus line, perform authentication for each of the devices connected to the bus line, and when the new device is connected to the bus line, acquire authentication information to be used for the authentication for the new device, and perform the authentication for the new device; and
- an illegitimate operation determination unit to determine whether or not illegitimate operation is performed on the bus line, by using the configuration information, an analysis result from the waveform analysis unit, and an authentication result from the device authentication unit.

Advantageous Effects of Invention

According to the present invention, it is possible to properly detect illegitimate operation on a bus line.

DESCRIPTION OF EMBODIMENTS

Figure 1:
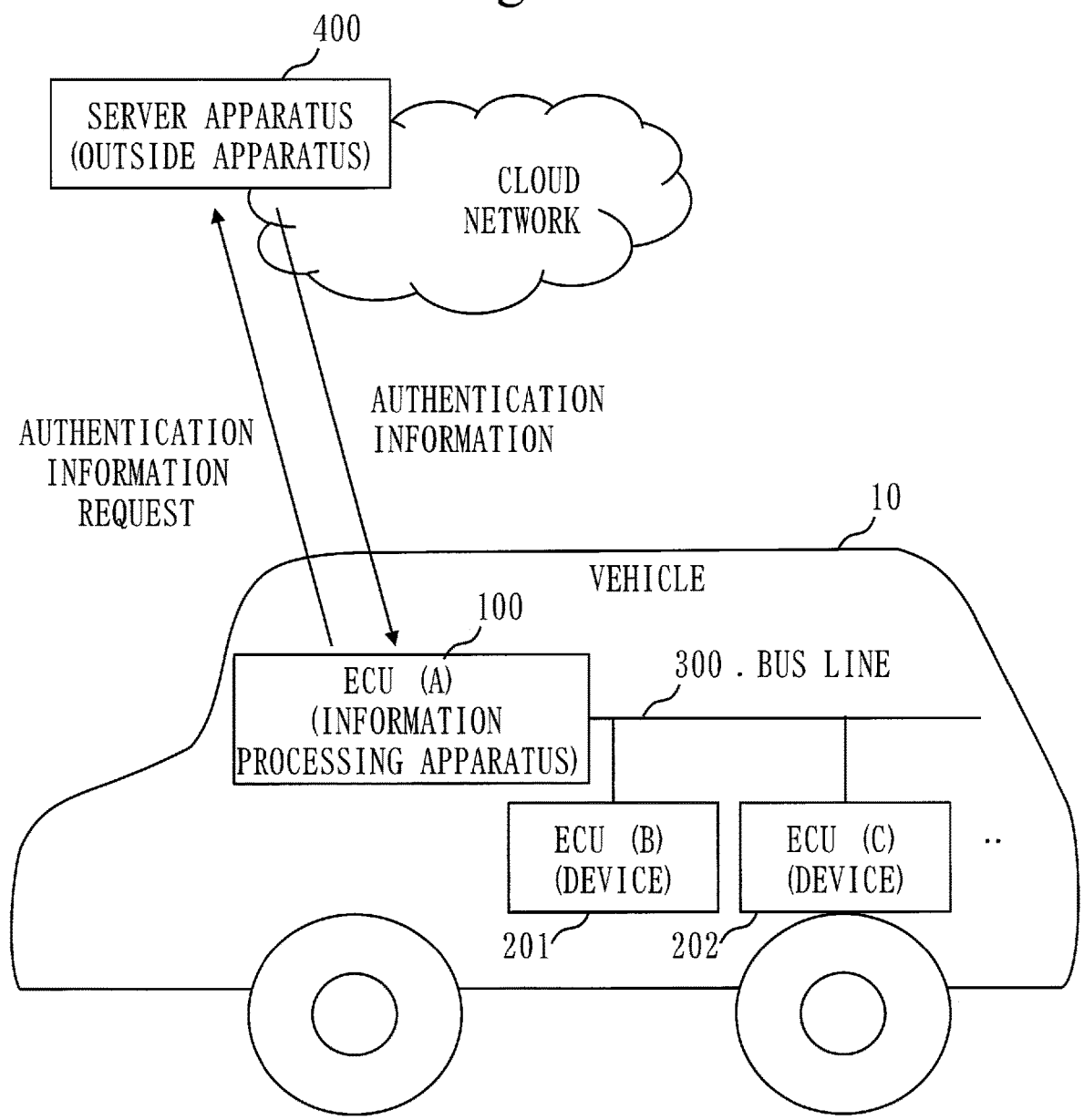
FIG. 1 is a diagram illustrating a system configuration example according to a first embodiment.

Hereinafter, embodiments of the present invention will be described with reference to the drawings. In the following description of the embodiments and the drawings, the same reference numerals indicate the same or corresponding parts.

First Embodiment

\*\*\*Description of Configuration\*\*\*

FIG. 1 illustrates a system configuration example according to an embodiment.

In a vehicle 10, a plurality of ECUs (Electronic Control Units) are connected to a bus line 300. Specifically, an ECU (A) 100, an ECU (B) 201, an ECU (C) 202 and the like are connected to the bus line 300. Note that, the ECU (A) 100 is equivalent to an information processing apparatus. Further, a process performed by the ECU (A) 100 is equivalent to an information processing method and an information processing program. Besides, hereinafter, each of the ECUs other than the ECU (A) 100, including the ECU (B) 201 and the ECU (C) 202, will also be referred to as a device.

The ECU (A) 100, the ECU (B) 201, and the ECU (C) 202 are devices which are permitted to be connected to the bus line 300, and are legitimate devices. On the other hand, an illegitimate ECU (device) is a device that is not permitted to be connected to the bus line 300.

The bus line 300 is a bus network such as a CAN, an LIN (Local Interconnect Network), or Ethernet (registered trademark).

A server apparatus 400 receives an authentication information request transmitted from the ECU (A) 100.

The server apparatus 400 stores authentication information of the ECU (B) 201 and the ECU (C) 202 and the like which are legitimate devices, in association with identifiers. Further, authentication information of a legitimate ECU (legitimate device) that is not currently connected to the bus line 300 of the vehicle 10 but is permitted to be connected to, is also stored in association with an identifier.

The server apparatus 400 transmits the authentication information to the ECU (A) 100 as a response to the authentication information request. Details of the authentication information request and the authentication information will be described later.

The server apparatus 400 is, for example, on a cloud network. The server apparatus 400 may be on the vehicle 10. When the server apparatus 400 is on the vehicle 10, it is possible to access the server apparatus 400 even in a situation where a network is usable. Note that, in the present embodiment, it is assumed that the server apparatus 400 is on the cloud network.

The server apparatus 400 is equivalent to an outside apparatus.

Figure 2:
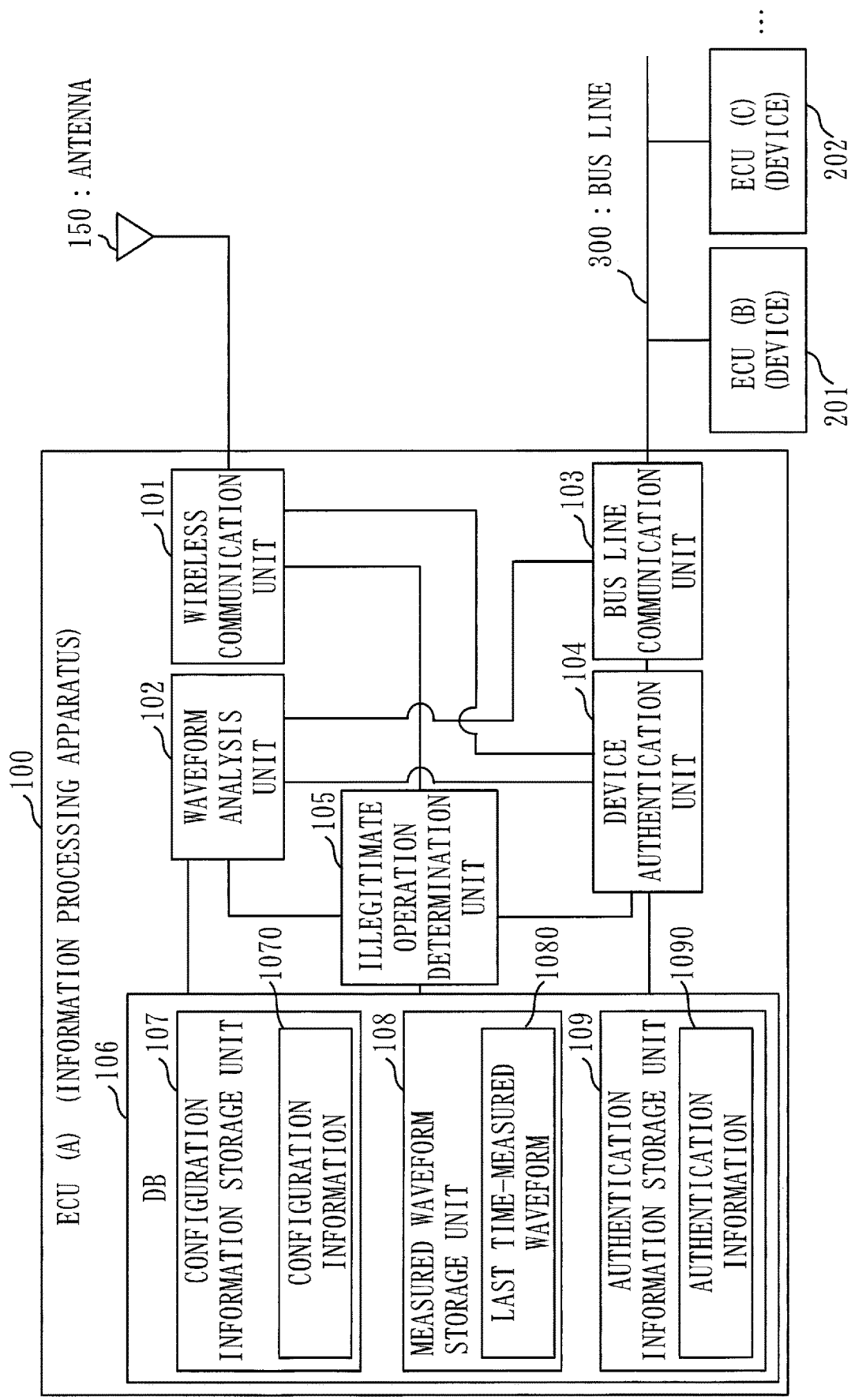
FIG. 2 is a diagram illustrating a functional configuration example of an ECU (A) according to the first embodiment.
Figure 3:
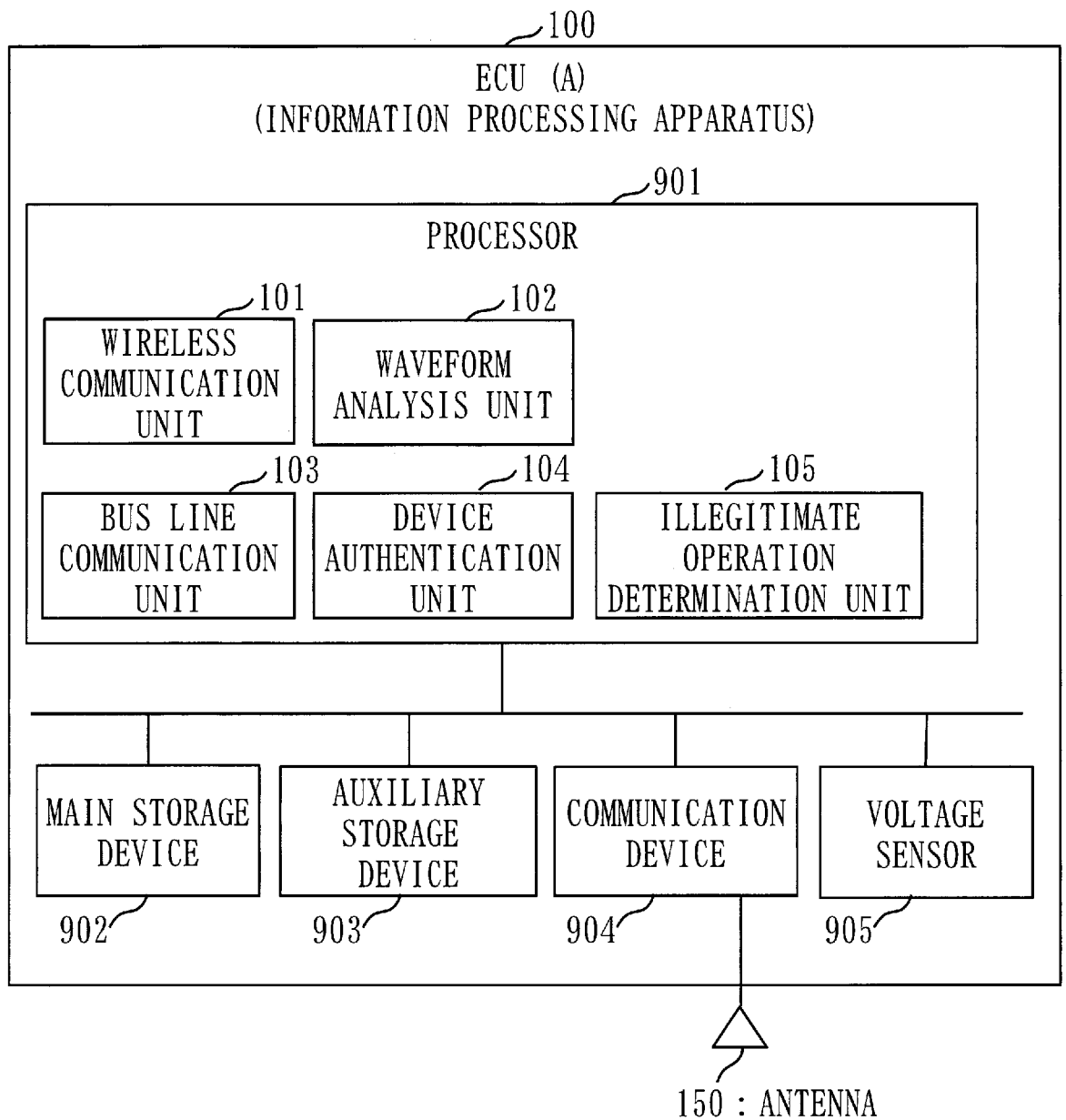
FIG. 3 is a diagram illustrating a hardware configuration example of the ECU (A) according to the first embodiment.

FIG. 2 illustrates a functional configuration example of the ECU (A) 100. Further, FIG. 3 illustrates a hardware configuration example of the ECU (A) 100. First, the hardware configuration example of the ECU (A) 100 will be described with reference to FIG. 3.

The ECU (A) 100 is a computer.

The ECU (A) 100 includes a processor 901, a main storage device 902, an auxiliary storage device 903, a communication device 904, and a voltage sensor 905 as pieces of hardware.

The auxiliary storage device 903 stores programs which realize functions of a wireless communication unit 101, a waveform analysis unit 102, a bus line communication unit 103, a device authentication unit 104, and an illegitimate operation determination unit 105 which are in FIG. 2. These programs are loaded from the auxiliary storage device 903 into the main storage device 902. Then, the processor 901 executes these programs to perform operation of the wireless communication unit 101, the waveform analysis unit 102, the bus line communication unit 103, the device authentication unit 104, and the illegitimate operation determination unit 105.

FIG. 3 schematically illustrates a state where the processor executes the programs that realize the functions of the wireless communication unit 101, the waveform analysis unit 102, the bus line communication unit 103, the device authentication unit 104, and the illegitimate operation determination unit 105.

Further, the auxiliary storage device 903 realizes a DB 106 in FIG. 2. Note that, it is acceptable that the main storage device 902 realizes the DB 106 in FIG. 2.

The communication device 904 communicates with the server apparatus 400 by using an antenna 150. Further, the communication device 904 is connected to the bus line 300 and communicates with the ECU (B) 201, the ECU (C) 202, and the like.

The voltage sensor 905 is connected to the bus line 300. The voltage sensor 905 measures a voltage value of the bus line 300. In the present embodiment, the voltage sensor 905 measures the voltage value by TDR (Time Domain Reflectometry). By TDR, reflection characteristics of a high frequency step signal transmitted on the bus line 300 are measured. More specifically, the voltage sensor 905 generates the high frequency step signal and transmits the generated high frequency step signal to the bus line 300. Further, the voltage sensor 905 receives a reflection wave of the high frequency step signal from the bus line 300. Then, the voltage sensor 905 measures the voltage value of the reflection wave and outputs the measured voltage value to the bus line communication unit 103.

The voltage sensor 905 is a sampler circuit, a comparator, an A/D (Analog/Digital) converter, a step generator, or the like.

Next, the functional configuration example of the ECU (A) 100 will be described with reference to FIG. 2.

The wireless communication unit 101 communicates with the server apparatus 400 by using the communication device 904 and the antenna 150. More specifically, the wireless communication unit 101 transmits the authentication information request to the server apparatus 400, and receives the authentication information from the server apparatus 400.

The waveform analysis unit 102 acquires from the bus line communication unit 103, a waveform indicating changes over time in the voltage value of the bus line 300, as a measured waveform. The measured waveform is a waveform indicating the changes over the time in the voltage value measured by the voltage sensor 905.

Further, the waveform analysis unit 102 analyzes the measured waveforms. More specifically, the waveform analysis unit 102 analyzes whether or not a measured waveform newly obtained matches a measured waveform (hereinafter, referred to as a last time-measured waveform) obtained when it is determined that illegitimate operation is not performed on the bus line 300. The last time-measured waveform is a waveform with a normal voltage value. The waveform analysis unit 102 may perform a noise correction such as averaging the measured waveforms. Further, a temperature at a time of measuring or a vehicle condition may be used for the noise correction. By doing this, it is possible to analyze the measured waveforms.

The waveform analysis unit 102 notifies the device authentication unit 104 and the illegitimate operation determination unit 105 of an analysis result.

The bus line communication unit 103 communicates with the ECU connected to the bus line 300 such as the ECU (B) 201 or the ECU (C) 202, by using the communication device 904.

Further, the bus line communication unit 103 transmits a step wave, acquires the voltage value measured from the voltage sensor 905, and outputs as the measured waveform, the waveform indicating the changes over time of the voltage value to the waveform analysis unit 102.

Further, the bus line communication unit 103 transmits a challenge value to other ECUs based on an instruction from the device authentication unit 104. The challenge value is a random number. The bus line communication unit 103 broadcasts the challenge value. Further, the bus line communication unit 103 receives response values for the challenge value from the ECUs connected to the bus line 300, and outputs the received response values to the device authentication unit 104.

In a device authentication process, the device authentication unit 104 performs the authentication for each ECU connected to the bus line 300 while determining whether or not a new ECU (a new device) is connected to the bus line 300, the new device being an ECU not included in configuration information 1070 which will be described later. Specifically, the device authentication unit 104 transmits the challenge value to other ECUs via the bus line communication unit 103. Further, the device authentication unit 104 receives the response values for the challenge value via the bus line communication unit 103, and determines by using the authentication information, whether or not the received response values are appropriate values.

When the new ECU is connected to the bus line 300, the device authentication unit 104 acquires from the server apparatus 400 via the wireless communication unit 101, the authentication information to be used for the authentication for the new ECU. Then, the device authentication unit 104 performs the authentication for the new ECU by using the acquired authentication information.

Further, the device authentication unit 104 may generate the authentication information to be used for the authentication for the new ECU, and perform the authentication for the new ECU by using the generated authentication information. The device authentication unit 104 generates, for example, the authentication information to be used for authentication for the ECU based on ECU information (for example, ECU ID) which can uniquely identify the ECU. The device authentication unit 104 can safely generate the authentication information by using key generation such as a key derivation function, ID-based encryption/function-type encryption, and the like.

The illegitimate operation determination unit 105 determines whether or not the illegitimate operation is performed on the bus line 300, by using the configuration information 1070, the analysis result from the waveform analysis unit 102, and the authentication result from the device authentication unit 104.

For example, the illegitimate operation determination unit 105 determines that the illegitimate operation is performed on the bus line 300, when the measured waveform and the last time-measured waveform match and there exists a device that fails in the authentication by the device authentication unit 104.

Further, the illegitimate operation determination unit 105 determines that the illegitimate operation is performed on the bus line 300, when the measured waveform and the last time-measured waveform do not match and there exists a device that fails in the authentication by the device authentication unit 104.

Further, when the measured waveform and the last time-measured waveform do not match and there exists no device that fails in the authentication by the device authentication unit 104, the illegitimate operation determination unit 105 analyzes whether or not a combination of devices included in the configuration information 1070 and a combination of devices obtained from the authentication results from the device authentication unit 104 match, and determines whether or not the illegitimate operation is performed on the bus line 300.

If the combination of the devices indicated in the configuration information 1070 and the combination of the devices obtained from the authentication results from the device authentication unit 104 match, the illegitimate operation determination unit 105 determines that the illegitimate operation is performed on the bus line 300.

On the other hand, if the combination of the devices connected to the bus line 300 indicated in the configuration information 1070 and the combination of the devices obtained from the authentication results from the device authentication unit 104 do not match, the illegitimate operation determination unit 105 analyzes the combination of the devices obtained from the authentication results from the device authentication unit 104 and determines whether or not a necessary ECU (necessary device) being an ECU which needs to be connected to the bus line 300 is connected to the bus line 300.

When the necessary ECU is not connected to the bus line 300, the illegitimate operation determination unit 105 determines that the illegitimate operation is performed on the bus line 300.

On the other hand, when the necessary ECU is connected to the bus line 300, the illegitimate operation determination unit 105 acquires as an assumed waveform, a waveform of the voltage value of the bus line 300 which is assumed in the combination of the devices obtained from the authentication results from the device authentication unit 104.

Then, the illegitimate operation determination unit 105 analyzes whether or not the measured waveform and the assumed waveform match, and if the measured waveform and the assumed waveform do not match, determines that the illegitimate operation is performed on the bus line 300.

On the other hand, when the measured waveform and the assumed waveform match, the illegitimate operation determination unit 105 determines that the illegitimate operation is not performed on the bus line 300. Then, the illegitimate operation determination unit 105 stores the measured waveform as a last time-measured waveform 1080 in the measured waveform storage unit 108, and also stores in the configuration information storage unit 107 as new configuration information 1070, information indicating the combination of the devices obtained from the authentication results from the device authentication unit 104.

Further, the illegitimate operation determination unit 105 may update communication information (for example, a database of the CAN), the authentication information, and software when it is determined that the illegitimate operation is not performed on the bus line 300. The communication information is the CAN database that defines a CAN ID to be transmitted and received. Further, the software is a program of the ECU (A) 100 or a program of another ECU. The illegitimate operation determination unit 105 updates the communication information and the software, for example, by acquiring the communication information and the software from the server apparatus 400 and writing into the auxiliary storage device 903, the communication information and the software which are acquired. Further, the illegitimate operation determination unit 105 updates the authentication information by writing the authentication information generated by the device authentication unit 104 into the auxiliary storage device 903.

The DB 106 is classified into a configuration information storage unit 107, a measured waveform storage unit 108, and an authentication information storage unit 109.

The configuration information 1070 is stored in the configuration information storage unit 107. The configuration information 1070 indicates identifiers of one or more ECUs that are known to be connected to the bus line 300. Further, the configuration information 1070 indicates whether or not each ECU known to be connected to the bus line 300 is the necessary ECU. Further, the configuration information 1070 indicates a position of each ECU on the bus line 300. Further, the configuration information 1070 may indicate a version of the software used in each ECU.

Since the position of each ECU on the bus line 300 is indicated in the configuration information 1070, the illegitimate operation determination unit 105 can recognize a switch of positions of the ECUs on the bus line 300 by an analysis using the assumed waveform, which will be described later.

The last time-measured waveform 1080 is stored in the measured waveform storage unit 108. The last time-measured waveform 1080 indicates the measured waveform (last time-measured waveform) obtained when it is determined by the illegitimate operation determination unit 105 that the illegitimate operation is not performed on the bus line 300.

Authentication information 1090 is stored in the authentication information storage unit 109. The authentication information 1090 is information used in the device authentication process by the device authentication unit 104. The authentication information 1090 is stored in the authentication information storage unit 109 for each ECU connected to the bus line 300. The authentication information 1090 is, for example, a key according to a common key scheme.

*Description of Operation*

Figure 4:
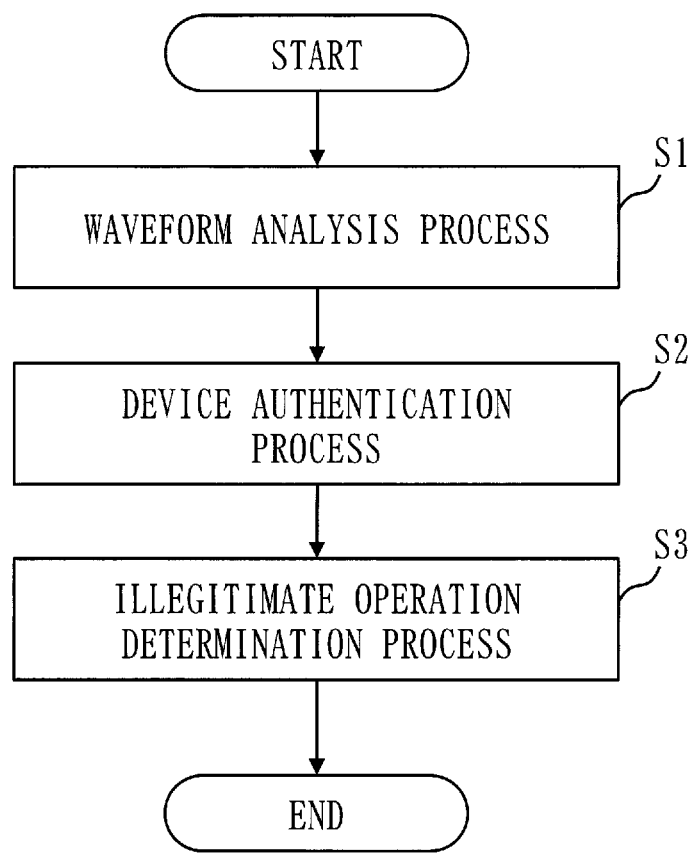
FIG. 4 is a flowchart illustrating an outline of operation of the ECU (A) according to the first embodiment.

An outline of the operation of the ECU (A) 100 according to the present embodiment will be described with reference to FIG. 4.

In a waveform analysis process (step S1), the waveform analysis unit 102 acquires the measured waveform by using the bus line communication unit 103 and the voltage sensor 905, and determines whether or not the measured waveform matches the last time-measured waveform 1080.

Since the waveform analysis process (step S1) is the same as, for example, a standard TDR, detailed descriptions will be omitted.

Besides, the waveform analysis unit 102 notifies the device authentication unit 104 and the illegitimate operation determination unit 105 of a result of the waveform analysis process (step S1), that is, whether or not the measured waveform matches the last time-measured waveform 1080.

In the device authentication process (step S2), the device authentication unit 104 transmits by a broadcast, the challenge value to other ECUs by using the bus line communication unit 103. Further, the device authentication unit 104 receives the response values for the challenge value by using the bus line communication unit 103. Then, the device authentication unit 104 determines by using the authentication information 1090, whether or not received response values are appropriate values.

Further, in the device authentication process (step S2), when it is found that the new ECU is connected to the bus line 300, the device authentication unit 104 acquires from the server apparatus 400, the authentication information to be used for the authentication for the new ECU. Then, the device authentication unit 104 performs the authentication for the new ECU by using the acquired authentication information.

Details of the device authentication process (step S2) will be described later with reference to FIGS. 5, 6, and 7.

In an illegitimate operation determination process (step S3), the illegitimate operation determination unit 105 determines whether or not the illegitimate operation is performed on the bus line 300, by using the analysis result from the waveform analysis unit 102 and the authentication results from the device authentication unit 104.

Details of the illegitimate operation determination process (step S3) will be described later with reference to FIGS. 8 and 9.

Next, details of the device authentication process (step S2) will be described with reference to FIGS. 5, 6, and 7.

Figure 5:
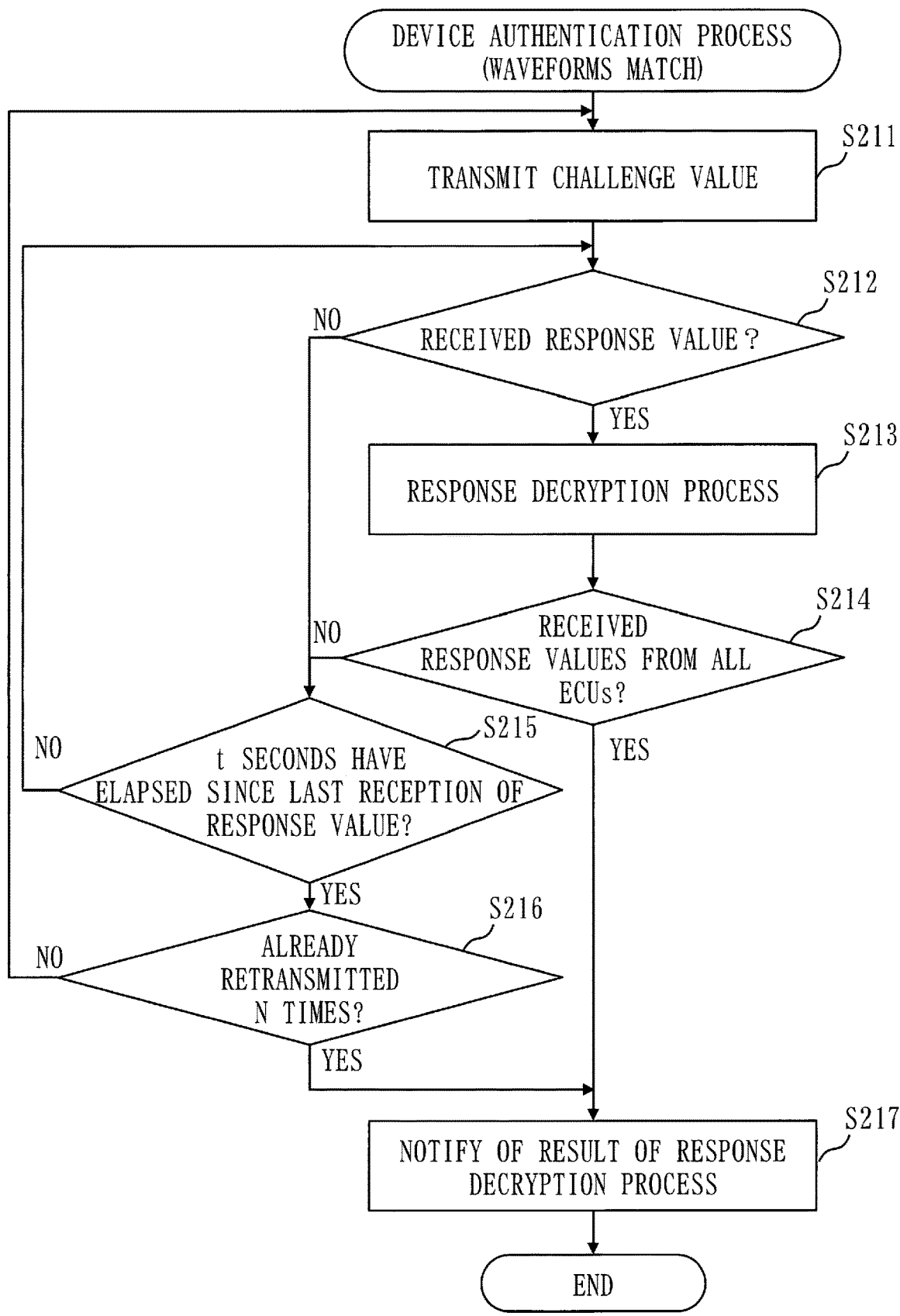
FIG. 5 is a flowchart illustrating a device authentication process (waveforms match) according to the first embodiment.

FIG. 5 illustrates the process of the device authentication unit 104 when the measured waveform matches the last time-measured waveform 1080 in the waveform analysis process (step S1).

Figure 6:
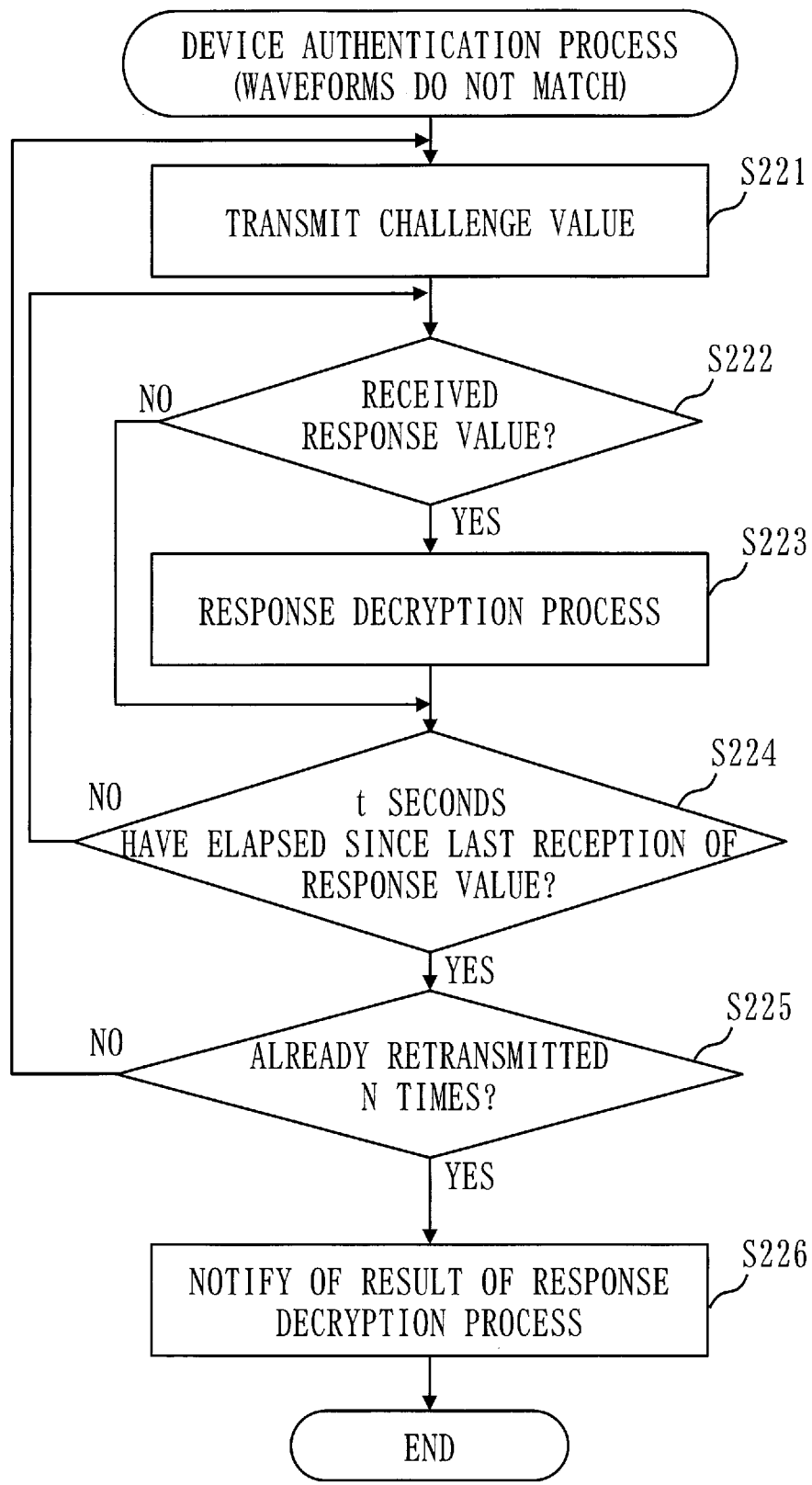
FIG. 6 is a flowchart illustrating a device authentication process (waveform do not match) according to the first embodiment.

FIG. 6 illustrates the process of the device authentication unit 104 when the measured waveform does not match the last time-measured waveform 1080 in the waveform analysis process (step S1).

Figure 7:
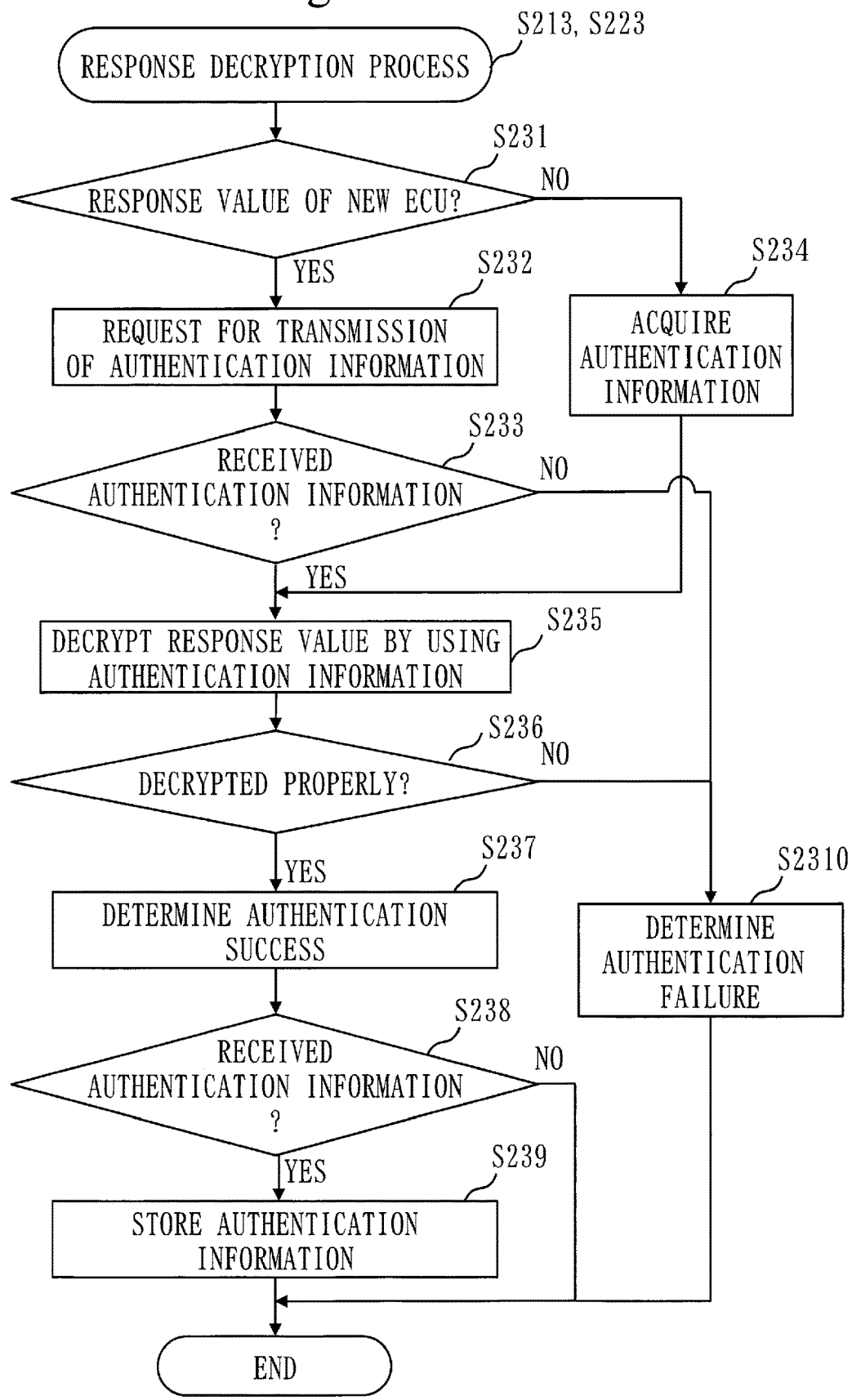
FIG. 7 is a flowchart illustrating a response decryption process according to the first embodiment.

FIG. 7 illustrates details of a response decryption process of step S213 in FIG. 5 and a response decryption process of step S223 in FIG. 6.

The response decryption process can be processed in parallel. That is, the device authentication unit 104 can execute the response decryption processes in parallel for the response values from the plurality of ECUs.

In FIG. 5, first, the device authentication unit 104 transmits by a broadcast, the challenge value to each ECU by using the bus line communication unit 103 (step S211).

When the response value is received from any one of the ECUs via the bus line communication unit 103 during a predetermined waiting time (YES in step S212), the device authentication unit 104 performs the response decryption process (step S213).

Details of the response decryption process (step S213) will be described later. The device authentication unit 104 determines whether or not the received response value is an appropriate value, by using the authentication information 1090 of the ECU which is a transmitter of the response value. Since the response value is a value obtained by encrypting the challenge value by using the authentication information 1090, the device authentication unit 104 decrypts the response value by using the authentication information 1090 and determines whether or not a same value as the challenge value can be obtained.

On the other hand, if the response value is not received during the waiting time, the device authentication unit 104 determines whether or not t seconds have elapsed since a last reception of the response value (step S215). Besides, a value of t is a value larger than the waiting time, and can be arbitrarily decided by a user of the ECU (A) 100.

After the response decryption process (step S213), the device authentication unit 104 checks whether or not the response values have been received from all the ECUs (step S214).

When there exists an ECU whose response value has not been received (NO in step S214), it is determined whether or not t seconds have elapsed since the last reception of the response value (step S215).

If t seconds have not elapsed since the last reception of the response value (NO in step S215), the process proceeds to step S212.

On the other hand, if t seconds have elapsed since the last reception of the response value (YES in step S215), the device authentication unit 104 determines whether or not the challenge value has already been retransmitted N times (step S216). If the challenge value has already been retransmitted N times (YES in step S216), a process of step S217 is performed.

Note that, the value of N can be arbitrarily decided by the user of the ECU (A) 100.

On the other hand, if the challenge value has not been retransmitted N times (NO in step S216), the device authentication unit 104 retransmits by a broadcast, the challenge value by using the bus line communication unit 103 (step S211). Note that, the ECU that has already transmitted the response value does not have to transmit the response value again even if the ECU receives the retransmitted challenge value.

When the response values are received from all the ECUs (YES in step S214), the process of step S217 is performed.

In step S217, the device authentication unit 104 notifies the illegitimate operation determination unit 105 of a result of the response decryption process.

For example, the device authentication unit 104 notifies the illegitimate operation determination unit 105 of a result that the challenge values are decrypted from the response values for all the ECUs. Alternatively, the device authentication unit 104 notifies the illegitimate operation determination unit 105 of a result that the challenge value is decrypted from the response value for the ECU (B) 201, but the challenge value is not decrypted from the response value for the ECU (C) 202, and so on. FIG. 6 illustrates the process of the device authentication unit 104 when the measured waveform does not match the last time-measured waveform 1080 in the waveform analysis process (step S1).

In FIG. 6, first, the device authentication unit 104 transmits by a broadcast, the challenge value to each ECU via the bus line communication unit 103 (step S221).

When the response value is received from any one of ECUs via the bus line communication unit 103 during the predetermined waiting time (YES in step S222), the device authentication unit 104 performs the response decryption process (step S223).

On the other hand, if the response value is not received during the waiting time, the device authentication unit 104 determines whether or not t seconds have elapsed since the last reception of the response value (step S224). Here, the value of t can also be arbitrarily decided by the user of the ECU (A) 100.

Even after the response decryption process (step S223), the device authentication unit 104 determines whether or not t seconds have elapsed since the last reception of the response value (step S224).

If t seconds have not elapsed since the last reception of the response value (NO in step S224), the process proceeds to step S222.

On the other hand, if t seconds have elapsed since the last reception of the response value (YES in step S224), the device authentication unit 104 determines whether or not the challenge value has already been retransmitted N times (step S225). If the challenge value has already been retransmitted N times (YES in step S225), a process of step S226 is performed.

Here, the value of N can also be arbitrarily decided by the user of the ECU (A) 100.

On the other hand, when the challenge value has not been retransmitted N times (NO in step S225), the device authentication unit 104 retransmits by a broadcast, the challenge value by using the bus line communication unit 103 (step S221). Note that, the ECU that has already transmitted the response value does not have to transmit the response value again even if the ECU receives the retransmitted challenge value.

In step S226, the device authentication unit 104 notifies the illegitimate operation determination unit 105 of the result of the response decryption process.

For example, the device authentication unit 104 notifies the illegitimate operation determination unit 105 of the result that the challenge values are decrypted from the response values for all the ECUs. Alternatively, the device authentication unit 104 notifies the illegitimate operation determination unit 105 of the result that the challenge value is decrypted from the response value for the ECU (B) 201, but the challenge value is not decrypted from the response value for the ECU (C) 202, and so on.

In FIG. 6, unlike step S214 in FIG. 5, determination is not performed, as to whether or not the response values have been received from all the ECUs. A flow in FIG. 6 is performed when the measured waveform and the last time-measured waveform 1080 are different. When the measured waveform and the last time-measured waveform 1080 are different, it is unknown whether the number of ECUs has increased or decreased. It is also unknown how many ECUs have increased and how many ECUs have decreased. Therefore, in the flow in FIG. 6, the determination is not performed, as to whether or not the response values have been received from all the ECUs.

Note that, the number of connected ECUs may be determined based on the measured waveform (depending on a capability of the waveform analysis unit 102). In this case, the determination may be performed, as to whether or not the response values have been received from all the ECUs.

Next, details of the response decryption process (step S213, step S223) will be described with reference to FIG. 7.

First, the device authentication unit 104 determines whether or not the received response value is the response value of the new ECU (step S231).

The response from the ECU to the challenge value includes the identifier of the ECU which is a transmitter of the response. The identifier of the ECU is information that can uniquely identify the ECU. The device authentication unit 104 compares the identifier included in the response from the ECU with the identifier included in the configuration information 1070. If a same identifier as the identifier included in the response from the ECU exists in the configuration information 1070, the determination of step S231 is NO. On the other hand, if the same identifier as the identifier included in the response from the ECU does not exist in the configuration information 1070, the transmitter of the response value is the new ECU which is newly connected to the bus line 300, and the determination in step S231 is YES.

Further, the identifier of the ECU may not be included in the response from the ECU to the challenge value. In this case, for example, an existing ECU for which the authentication information 1090 is already stored in the authentication information storage unit 109 transmits the response without the identifier. By doing this, the device authentication unit 104 can distinguish the response from the new ECU from the response from the existing ECU that is already connected to the bus line 300. That is, when the response including the identifier is received, the transmitter of the response value is the new ECU newly connected to the bus line 300, and the determination in step S231 is YES. Besides, in this case, the CAN ID can be used for identification of the existing ECU.

In a case of YES in step S231, a process of step S232 is performed, and in a case of NO in step S231, a process of step S234 is performed.

In step S232, the device authentication unit 104 requests the server apparatus 400 for the transmission of the authentication information of the new ECU via the wireless communication unit 101. That is, the device authentication unit 104 transmits the authentication information request to the server apparatus 400 via the wireless communication unit

101. The identifier of the new ECU is included in the authentication information request.

In the server apparatus 400, the authentication information is managed in association with the identifier of the ECU. Therefore, the server apparatus 400 transmits to the ECU (A) 100, the authentication information which is associated with the identifier included in the authentication information request.

Besides, if the identifier of the new ECU is illegitimate, the identifier of the new ECU is not managed by the server apparatus 400. Therefore, the server apparatus 400 cannot transmit to the ECU (A) 100, the authentication information of the new ECU.

When the device authentication unit 104 is able to receive the authentication information of the new ECU from the server apparatus 400 via the wireless communication unit 101 (YES in step S233), the process proceeds to step S235. On the other hand, if the device authentication unit 104 is not able to receive the authentication information of the new ECU from the server apparatus 400 (NO in step S233), the process proceeds to step S2310.

In step S234, the device authentication unit 104 acquires corresponding authentication information 1090 from the authentication information storage unit 109.

The authentication information storage unit 109 manages the authentication information 1090 in association with the identifier of the ECU. The device authentication unit 104 outputs to the authentication information storage unit 109, the identifier included in the response from the ECU, and acquires corresponding authentication information 1090 from the authentication information storage unit 109.

In step S235, the decryption process on the response value is performed by using the authentication information received in step S233 or the authentication information acquired in step S234.

Although the present embodiment is premised on verification based on a common key encryption scheme, verification using an asymmetric key, verification using an authentication function (MAC (Message Authentication Code)), or the like may be performed.

If the response value is not decrypted properly and a value matching the challenge value is not obtained (NO in step S236), the device authentication unit 104 determines authentication failure for a corresponding ECU (step S2310).

On the other hand, when the response value is decrypted properly and a value matching the challenge value is obtained (YES in step S236), the device authentication unit 104 determines authentication success for the corresponding ECU (step S237).

Further, if the authentication information for which a proper decryption is made is the authentication information received in step S233 (YES in step S238), the device authentication unit 104 stores as the authentication information 1090 in the authentication information storage unit 109, the authentication information received in step S233 in association with the identifier of the new ECU (step S239).

Besides, in a flow in FIG. 7, only the ECU (A) 100 performs the authentication for another ECU. However, it is also acceptable that an ECU other than the ECU (A) 100 performs the authentication for the ECU (A) 100 (mutual authentication).

Next, details of the illegitimate operation determination process (step S3) will be described with reference to FIGS. 8 and 9.

Figure 8:
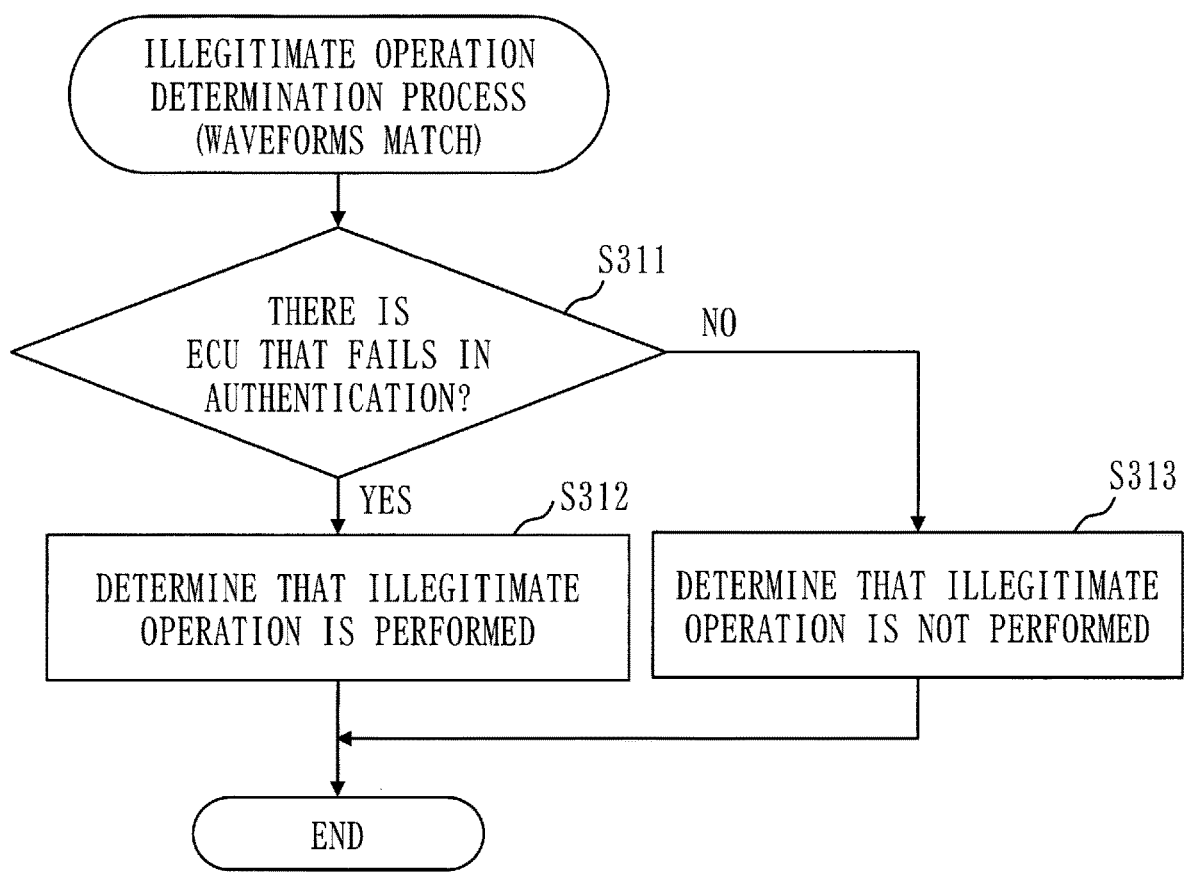
FIG. 8 is a flowchart illustrating an illegitimate operation determination process (waveforms match) according to the first embodiment.

FIG. 8 illustrates a process of the illegitimate operation determination unit 105 when the measured waveform matches the last time-measured waveform 1080 in the waveform analysis process (step S1).

Figure 9:
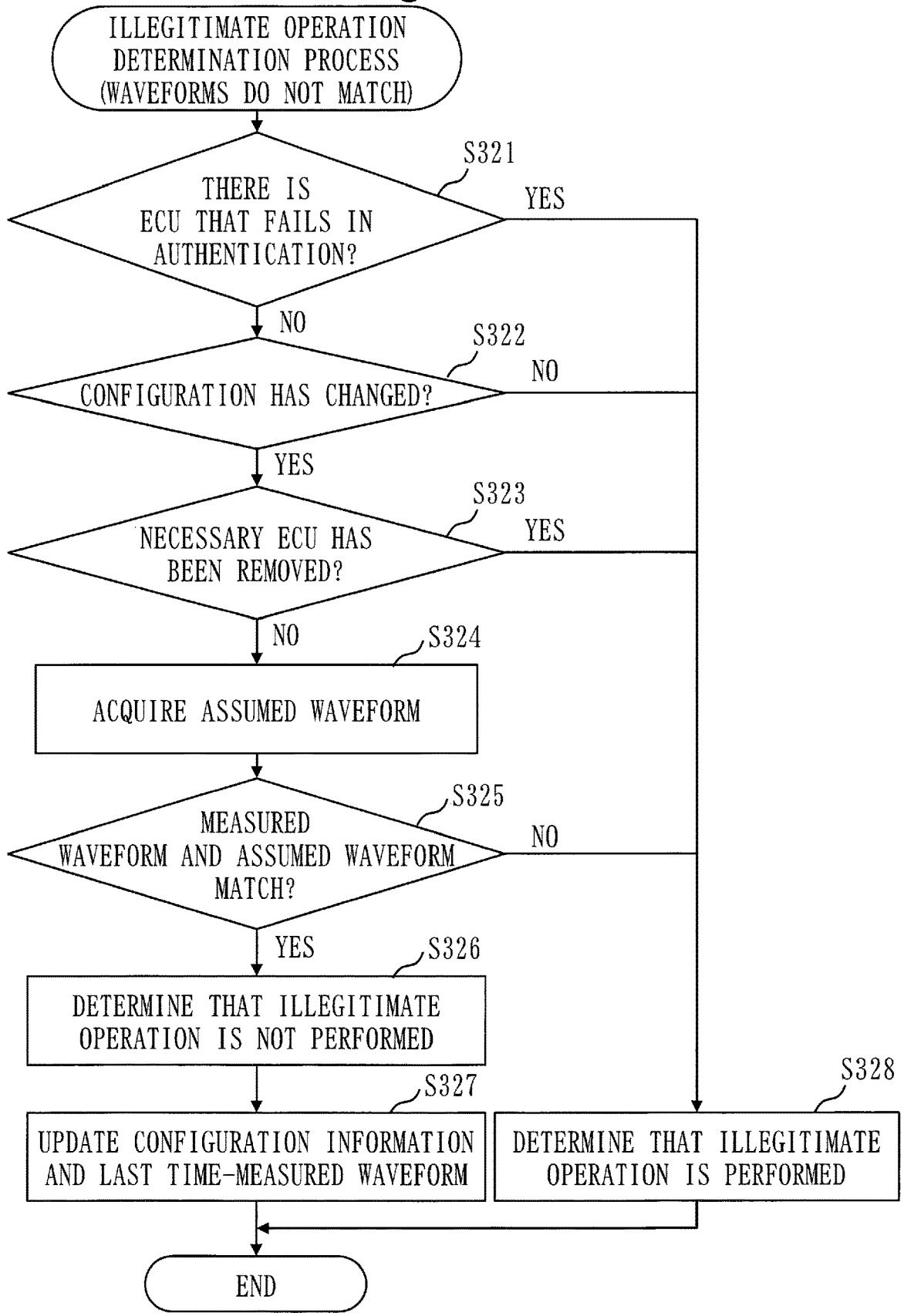
FIG. 9 is a flowchart illustrating an illegitimate operation determination process (waveforms do not match) according to the first embodiment.

FIG. 9 illustrates a process of the illegitimate operation determination unit 105 when the measured waveform does not match the last time-measured waveform 1080 in the waveform analysis process (step S1).

In FIG. 8, the illegitimate operation determination unit 105 determines whether or not there is an ECU that fails in the authentication in the device authentication process of the device authentication unit 104 (step S311).

When any one of the ECUs fails in the authentication (YES in step S311), that is, when the result of the response decryption process notified in step S217 in FIG. 5 indicates the authentication failure for any one of the ECUs, the illegitimate operation determination unit 105 determines that the illegitimate operation is performed (step S312).

On the other hand, when there is no ECU that fails in the authentication (NO in step S311), that is, when the result of the response decryption process notified in step S217 in FIG. 5 indicates the authentication success for all the ECUs, the illegitimate operation determination unit 105 determines that the illegitimate operation is not performed (step S313).

A flow in FIG. 8 is performed when the measured waveform matches the last time-measured waveform 1080. If the measured waveform matches the last time-measured waveform 1080, a combination and an arrangement of the ECUs at a time of acquisition of the last time-measured waveform 1080 and those at this time are supposed be the same. A reason why there exists an ECU that fails in the authentication in this situation (YES in step S311) is thought to be that: an ECU (hereinafter referred to as an ECU (z)) that has been connected to the bus line 300 at the time of the acquisition of the last time-measured waveform 1080 has been replaced with a new ECU (hereinafter, referred to as an ECU (x)) whose waveform characteristics are the same as those of the ECU (z): the identifier acquired from the ECU (x) is not registered in the server apparatus 400; and thus the authentication information of the ECU (x) is not obtained from the server apparatus 400. That is, the ECU (x) is thought to spoof the ECU (z) and to be connected to the bus line 300.

On the other hand, when there exists no ECU that fails in the authentication (NO in step S311), it is thought that the ECU that had been connected to the bus line 300 at the time of the acquisition of the last time-measured waveform 1080 is still connected to the bus line 300.

In FIG. 9, the illegitimate operation determination unit 105 determines whether or not there is the ECU that fails in the authentication in the device authentication process of the device authentication unit 104 (step S321).

When any one of the ECUs fails in the authentication (YES in step S321), that is, when the result of the response decryption process notified in step S217 in FIG. 5 indicates the authentication failure for any one of the ECUs, the illegitimate operation determination unit 105 determines that the illegitimate operation is performed on the bus line 300 (step S328).

A flow in FIG. 9 is performed when the measured waveform does not match the last time-measured waveform 1080. In a case of YES in step S321, that is, if any one of the ECUs fails in the authentication, the identifier of the ECU (hereinafter, referred to as the ECU (x)) that fails in the authentication is not registered in the server apparatus 400. Therefore, it is considered that the authentication information of the ECU (x) is not obtained from the server apparatus 400. Then, it is considered that the measured waveform does not match the last time-measured waveform 1080 since the ECU (x) is newly connected to the bus line 300.

On the other hand, when there exists no ECU that fails in the authentication (NO in step S321), that is, when the result of the response decryption process notified in step S217 in FIG. 5 indicates the authentication success for all the ECUs, the illegitimate operation determination unit 105 determines whether or not a configuration of the ECUs connected to the bus line 300 has changed (step S322).

More specifically, the illegitimate operation determination unit 105 determines whether or not a combination of the identifiers included in the responses that the device authentication unit 104 receives from each ECU and a combination of the identifiers of the ECUs indicated in the configuration information 1070 match. If the combinations of identifiers match, the illegitimate operation determination unit 105 determines that the configuration of the ECUs does not change (NO in step S322). On the other hand, if the combinations of identifiers do not match, the illegitimate operation determination unit 105 determines that the configuration of the ECUs has changed (YES in step S322).

When it is determined that the configuration of the ECUs does not change (NO in step S322), the illegitimate operation determination unit 105 determines that the illegitimate operation is performed on the bus line 300 (step S328).

In a case of NO in step S322, although the configuration of the ECUs does not change, the measured waveform does not match the last time-measured waveform 1080. The following two are considered as reasons for this phenomenon.
(1) There is no change on the combination of the ECUs connected to the bus line 300, but the arrangement of the ECUs has changed.
(2) A silent node is connected to the bus line 300.

The silent node is a device that does not send back the response to the challenge value. When the silent node is connected to the bus line 300, the response is not received from the silent node. Therefore, the device authentication unit 104 determines that all the ECUs succeed in the authentication. On the other hand, since the silent node is connected, the measured waveform and the last time-measured waveform 1080 do not match.

When it is determined that the configuration of the ECUs changes (YES in step S322), the illegitimate operation determination unit 105 determines whether or not the necessary ECU has been removed from the bus line 300 (step S323).

The necessary ECU is an ECU necessary for traveling of the vehicle 10. For example, an ECU for steering wheel control is the ECU necessary for the traveling of the vehicle 10, and therefore, is equivalent to the necessary ECU. On the other hand, an ECU for controlling a car audio is not the ECU necessary for the traveling of the vehicle 10, and therefore, is not equivalent to the necessary ECU.

The illegitimate operation determination unit 105 determines whether or not the identifier of the necessary ECU is included in the identifiers included in the responses received from each ECU, and determines whether or not the necessary ECU has been removed from the bus line 300.

When the necessary ECU has been removed (YES in step S323), the illegitimate operation determination unit 105 determines that the illegitimate operation is performed on the bus line 300 (step S328).

When the necessary ECU has not been removed (NO in step S323), the illegitimate operation determination unit 105 acquires the assumed waveform (step S324).

The assumed waveform is a voltage waveform assumed in a current configuration of the ECUs. The illegitimate operation determination unit 105 estimates the current configuration of the ECUs based on the combination of the identifiers included in the responses that the device authentication unit 104 receives from each ECU. Then, the illegitimate operation determination unit 105 acquires (calculates) the assumed waveform based on the estimated current configuration of the ECUs.

Alternatively, the illegitimate operation determination unit 105 may transmit the estimated current configuration of the ECUs to the server apparatus 400 and cause the server apparatus 400 to calculate the assumed waveform. In this case, the illegitimate operation determination unit 105 acquires (receives) the assumed waveform from the server apparatus 400 via the wireless communication unit 101.

Next, the illegitimate operation determination unit 105 compares the measured waveform with the assumed waveform acquired in step S324 (step S325).

If the measured waveform and the assumed waveform do not match (NO in step S325), the illegitimate operation determination unit 105 determines that the illegitimate operation is performed on the bus line 300 (step S328). Besides, in step S325, if the measured waveform and the assumed waveform are within a predetermined error range, the illegitimate operation determination unit 105 determines that the measured waveform and the assumed waveform match.

If the measured waveform and the assumed waveform do not match, that is, if the measured waveform is largely different from the assumed waveform, it is considered that the silent node is connected. As described above, the silent node is an ECU that does not send back the response to the challenge value. When the silent node is connected to the bus line 300, the response is not received from the silent node. Therefore, the device authentication unit 104 determines that all the ECUs have succeeded in the authentication (NO in step S321). On the other hand, since the silent node is connected, the measured waveform and the assumed waveform do not match.

When the measured waveform and the assumed waveform match (YES in step S325), the illegitimate operation determination unit 105 determines that the illegitimate operation is not performed on the bus line 300 (step S326).

In this case, there is no ECU which fails in the authentication, the configuration of the ECUs has changed, the necessary ECU has not been removed, and the measured waveform and the assumed waveform match. Therefore, it is considered that the configuration of the ECUs has changed because an ECU has been removed which is not the necessary ECU and has been connected to the bus line 300 at the time of the acquisition of the last time-measured waveform 1080. Alternatively, it is considered that an ECU that has not been connected to the bus line 300 at the time of the acquisition of the last time-measured waveform 1080 is added, and the identifier of the added ECU is registered in the server apparatus 400 (hence, the authentication by the device authentication unit 104 succeeds). Alternatively, it is considered that an ECU which is not the necessary ECU and has been connected to the bus line 300 at the time of the acquisition of the last time-measured waveform 1080 is replaced with another ECU, and the identifier after the replacement is registered in the server apparatus 400 (hence, the authentication by the device authentication unit 104 succeeds).

Subsequently, the illegitimate operation determination unit 105 updates the configuration information 1070 and the last time-measured waveform 1080 (step S327).

That is, the illegitimate operation determination unit 105 stores in the configuration information storage unit 107 as new configuration information 1070, information indicating the combination of the identifiers included in the responses that the device authentication unit 104 receives from each ECU.

Further, the illegitimate operation determination unit 105 stores in the measured waveform storage unit 108, a current measured waveform as a new last time-measured waveform 1080.

Description of Effect of Embodiment

According to the present embodiment, it is possible to properly detect the illegitimate operation on the bus line. More specifically, according to the present embodiment, it is possible to properly distinguish a case where a legitimate device is newly added to the bus line or a case where a device is removed from the bus line, from a case where an illegitimate device is added to the bus line.

Further, according to the present embodiment, it is possible to detect illegitimate operation which is an illegitimate connection of the silent node.

Further, according to the present embodiment, it is possible to detect an illegitimate connection of an ECU which spoofs another ECU and is not the silent node.

Further, in the present embodiment, since the configuration information and the measured waveform are updated every time it is determined that there is no illegitimate operation, it is possible to obtain an appropriate device authentication result and an appropriate illegitimate connection determination result.

Further, according to the present embodiment, it is possible to realize appropriate functions corresponding to the configuration, the functions including updates of communication information and software.

Besides, in the present embodiment, the waveform indicating the changes over time in the voltage value is used as the measured waveform. A waveform of an impedance value may be used as the measured waveform instead of the waveform of the voltage value. In this case, the waveform analysis unit 102 has a function of converting a measured voltage value into the impedance value based on an applied-voltage value. Further, the waveform analysis unit 102 may convert an elapsed time into a length direction of the bus line 30. In this case, the waveform analysis unit 102 has a function of converting the elapsed time at a measurement point into the length direction based on a transmission path delay time.

Further, when the measured waveform and the last time-measured waveform match, the process may end when the device authentication is performed the same number of times as authentication has been performed the last time. In this case, a processing time can be shortened.

\*\*\*Description of Hardware Configuration\*\*\*

Finally, supplementary descriptions of the hardware configuration of the ECU (A) 100 will be given.

The processor 901 is an IC (Integrated Circuit) that performs processing.

The processor 901 is a CPU (Central Processing Unit), a DSP (Digital Signal Processor), or the like.

The main storage device 902 is an RAM (Random Access Memory).

The auxiliary storage device 903 is an ROM (Read Only Memory), a flash memory, an HDD (Hard Disk Drive), or the like.

An OS (Operating System) is also stored in the auxiliary storage device 903.

Then, at least a part of the OS is executed by the processor 901.

The processor 901 executes programs that realize functions of the wireless communication unit 101, the waveform analysis unit 102, the bus line communication unit 103, the device authentication unit 104, and the illegitimate operation determination unit 105 while executing at least the part of the OS.

Further, the processor 901 executes the programs that realize the functions of the wireless communication unit 101, the waveform analysis unit 102, the bus line communication unit 103, the device authentication unit 104, and the illegitimate operation determination unit 105 while executing at least the part of the OS.

By the processor 901 executing the OS, task management, memory management, file management, communication control, and the like are performed.

Further, at least one of information, data, a signal value, and a variable value indicating a processing result from the wireless communication unit 101, the waveform analysis unit 102, the bus line communication unit 103, the device authentication unit 104, and the illegitimate operation determination unit 105 is stored in at least one of the main storage device 902, the auxiliary storage device 903, and a register and a cache memory in the processor 901.

Further, the programs that realize the functions of the wireless communication unit 101, the waveform analysis unit 102, the bus line communication unit 103, the device authentication unit 104, and the illegitimate operation determination unit 105 may be stored in a portable storage medium such as a magnetic disk, a flexible disk, an optical disk, a compact disk, a Blu-ray (registered trademark) disk, or a DVD.

Further, "unit" of the wireless communication unit 101, the waveform analysis unit 102, the bus line communication unit 103, the device authentication unit 104, and the illegitimate operation determination unit 105, may be read as "circuit" or "step" or "procedure" or "process".

Further, the ECU (A) 100 may be realized by an electronic circuit such as a logic IC (Integrated Circuit), a GA (Gate Array), an ASIC (Application Specific Integrated Circuit), or an FPGA (Field-Programmable Gate Array).

Besides, the processor and the above electronic circuit are also collectively referred to as processing circuitry.

REFERENCE SIGNS LIST

10: vehicle, 100: ECU (A), 101: wireless communication unit, 102: waveform analysis unit, 103: bus line communication unit, 104: device authentication unit, 105: illegitimate operation determination unit, 106: DB, 150: antenna, 201: ECU (B), 202: ECU (C), 300: bus line, 400: server apparatus, 901: processor, 902: main storage device, 903: auxiliary storage device, 904: communication device, 905: voltage sensor, 1070: configuration information, 1080: last time-measured waveform, 1090: authentication information.

The invention claimed is:

1. An information processing apparatus comprising:
processing circuitry
to analyze a measured waveform which is a waveform obtained by measuring one of a voltage value and an impedance value of a bus line;

to determine whether or not a new device is connected to the bus line, the new device being a device not included in configuration information which includes one or more devices known to be connected to the bus line, perform authentication for each of the devices connected to the bus line, and when the new device is connected to the bus line, acquire authentication information to be used for the authentication for the new device, and perform the authentication for the new device; and to determine whether or not illegitimate operation is performed on the bus line, by using the configuration information, an analysis result of the measured waveform, and an authentication result of the device, wherein when the configuration information related only to the devices necessary for traveling of a vehicle on which the information processing apparatus is installed has changed, the processing circuitry determines that a devices necessary for traveling of a vehicle has been removed, wherein when the configuration information related only to the devices necessary for traveling of a vehicle has not changed, the processing circuitry determines whether the measured waveform matches a last time measured waveform to determine whether a silent node is connected, and wherein the processing circuitry acquires an identifier of the new device from the new device, when the new device is connected to the bus line, and notifies an outside apparatus of the acquired identifier of the new device, the outside apparatus storing authentication information of a legitimate device in association with an identifier of the legitimate device, and when the identifier of the new device matches the identifier of the legitimate device, acquires authentication information of the new device from the outside apparatus.

2. The information processing apparatus according to claim 1, the information processing apparatus further comprising a memory to store a last time-measured waveform which is a measured waveform obtained when it is determined that the illegitimate operation is not performed on the bus line, and wherein when the measured waveform is obtained after the memory stores the last time-measured waveform, the processing circuitry analyzes whether or not the measured waveform obtained and the last time-measured waveform match, and determines that the illegitimate operation is performed on the bus line, when the measured waveform and the last time-measured waveform match and there exists a device which fails in authentication.

3. The information processing apparatus according to claim 1, the information processing apparatus further comprising a memory to store a last time-measured waveform which is a measured waveform obtained when it is determined that the illegitimate operation is not performed on the bus line, and wherein when the measured waveform is obtained after the memory stores the last time-measured waveform, the processing circuitry analyzes whether or not the measured waveform obtained and the last time-measured waveform match, and determines that the illegitimate operation is performed on the bus line, when the measured waveform and the last time-measured waveform do not match and there exists a device which fails in authentication.

4. The information processing apparatus according to claim 1, the information processing apparatus further comprising a memory to store a last time-measured waveform which is a measured waveform obtained when it is determined that the illegitimate operation is not performed on the bus line, and wherein when the measured waveform is obtained after the memory stores the last time-measured waveform, the processing circuitry analyzes whether or not the measured waveform obtained and the last time-measured waveform match, and when the measured waveform and the last time-measured waveform do not match and there exists no device which fails in authentication, analyzes whether or not a combination of devices included in the configuration information and a combination of devices obtained from authentication results of the devices match, and determines whether or not the illegitimate operation is performed on the bus line.

5. The information processing apparatus according to claim 4, wherein the processing circuitry determines that the illegitimate operation is performed on the bus line, when the combination of the devices included in the configuration information and the combination of the devices obtained from the authentication results of the devices match.

6. The information processing apparatus according to claim 4, wherein when the combination of the devices connected to the bus line included in the configuration information and the combination of the devices obtained from the authentication results of the devices do not match, the processing circuitry analyzes the combination of the devices obtained from the authentication results of the devices, determines whether or not a necessary device being an device which needs to be connected to the bus line is connected to the bus line, and when the necessary device is not connected to the bus line, determines that the illegitimate operation is performed on the bus line.

7. The information processing apparatus according to claim 6, wherein when the necessary device is connected to the bus line, the processing circuitry acquires as an assumed waveform, either waveform of the voltage value or the impedance value of the bus line which is assumed for the combination of the devices obtained from the authentication results, and analyzes whether or not the measured waveform and the assumed waveform match, and determines that the illegitimate operation is performed on the bus line, when the measured waveform and the assumed waveform do not match.

8. The information processing apparatus according to claim 7, wherein when the measured waveform and the assumed waveform match, the processing circuitry determines that the illegitimate operation is not performed on the bus line, stores the measured waveform in a predetermined storage area as a last time-measured waveform, and stores in the predetermined storage area as new configuration information, information indicating the combination of the devices obtained from the authentication results of the devices.

9. The information processing apparatus according to claim 8,
wherein when the illegitimate operation is not performed on the bus line, the processing circuitry stores at least one of the authentication information, communication information, and software in the predetermined storage area.

10. The information processing apparatus according to claim 1,
wherein the processing circuitry generates the authentication information to be used for the authentication for the new device, and performs the authentication for the new device by using the authentication information generated.

11. An information processing method comprising:
analyzing a measured waveform which is a waveform obtained by measuring one of a voltage value and an impedance value of a bus line;
determining whether or not a new device is connected to the bus line, the new device being a device not included in configuration information which includes one or more devices known to be connected to the bus line, performing authentication for each of the devices connected to the bus line, and when the new device is connected to the bus line, acquiring authentication information to be used for the authentication for the new device, and performing the authentication for the new device; and
determining whether or not illegitimate operation is performed on the bus line, by using the configuration information, an analysis result of the measured waveform, and an authentication result of the device,
wherein when the configuration information related only to the devices necessary for traveling of a vehicle for which the information processing is performed has changed, determines that a device necessary for traveling of the vehicle has been removed,
wherein when the configuration information related only to the device necessary for traveling of the vehicle has not changed, determines whether the measured waveform matches a last time measured waveform to determine whether a silent node is connected, and
wherein the method further comprising:
acquiring an identifier of the new device from the new device, when the new device is connected to the bus line, and
notifying an outside apparatus of the acquired identifier of the new device, the outside apparatus storing authentication information of a legitimate device in association with an identifier of the legitimate device, and when the identifier of the new device matches the identifier of the legitimate device, acquires authentication information of the new device from the outside apparatus.

12. A non-transitory computer readable medium storing an information processing program which causes a computer to execute:
a waveform analysis process of analyzing a measured waveform which is a waveform obtained by measuring one of a voltage value and an impedance value of a bus line;
a device authentication process of determining whether or not a new device is connected to the bus line, the new device being a device not included in configuration information which includes one or more devices known to be connected to the bus line, performing authentication for each of the devices connected to the bus line, and when the new device is connected to the bus line, acquiring authentication information to be used for the authentication for the new device, and performing the authentication for the new device; and
an illegitimate operation determination process of determining whether or not illegitimate operation is performed on the bus line, by using the configuration information, an analysis result of the waveform analysis process, and an authentication result of the device authentication process,
wherein when the configuration information related only to the devices necessary for traveling of a vehicle for which information processing is performed has changed, determines that a device necessary for traveling of the vehicle has been removed,
wherein when the configuration information related only to the device necessary for traveling of the vehicle has not changed, determines whether the measured waveform matches a last time measured waveform to determine whether a silent node is connected, and
wherein the program further causes the computer to execute;
an acquiring process of acquiring an identifier of the new device from the new device, when the new device is connected to the bus line, and
a notifying process of notifying an outside apparatus of the acquired identifier of the new device, the outside apparatus storing authentication information of a legitimate device in association with an identifier of the legitimate device, and when the identifier of the new device matches the identifier of the legitimate device, acquires authentication information of the new device from the outside apparatus.

* * * * *